(12) United States Patent
Shimoosawa et al.

(10) Patent No.: US 6,459,423 B1
(45) Date of Patent: *Oct. 1, 2002

(54) COMMUNICATION TERMINAL APPARATUS AND COMMUNICATION TERMINAL APPARATUS CONTROL METHOD

(75) Inventors: Hiroyuki Shimoosawa; Toshiaki Shinano, both of Fujisawa (JP)

(73) Assignee: Matsushita Graphic Communication Systems, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,517

(22) Filed: Apr. 28, 1999

(30) Foreign Application Priority Data

Dec. 14, 1998 (JP) .......................................... 10-354897

(51) Int. Cl.[7] ................................................. G09G 5/00
(52) U.S. Cl. .................. 345/173; 379/93.19; 379/93.23
(58) Field of Search ................................. 345/156, 157, 345/173; 358/442; 370/396; 379/93.07, 93.09, 93.19, 93.23; 709/217

(56) References Cited

U.S. PATENT DOCUMENTS 5,418,625 A * 5/1995 Shimoosawa ............... 358/442
5,764,736 A * 6/1998 Shachar et al. ........... 379/93.09
5,917,894 A * 6/1999 Minamizawa ............. 379/93.07
6,026,435 A * 2/2000 Enomoto et al. ............ 709/217
6,052,372 A * 4/2000 Gittins et al. ................ 370/396
6,067,172 A * 5/2000 Yokoyama ................... 358/442

FOREIGN PATENT DOCUMENTS

JP          2184151        7/1990

OTHER PUBLICATIONS

An English Language abstract of JP 2-184151.

* cited by examiner

Primary Examiner—Steven Saras
Assistant Examiner—Uchendu O. Anyaso
(74) Attorney, Agent, or Firm—Greenblum & Bernstein, P.L.C.

(57) ABSTRACT

The communication terminal apparatus according to the present invention comprises a determination section for checking whether or not a dial key is pressed. If a dial key is pressed, the determination section checks whether the "dial key/browser dual-function" flag in the setting table is ON or OFF. If it is ON, the determination section checks whether the "focus HTML input field" flag is ON or OFF. If it is ON, the determination section determines that the input data of the dial key be subjected to browser input processing. On the other hand, if the "dial key/browser input dual-function" flag is OFF, this determination section determines that the dial key be used for dial input processing.

9 Claims, 12 Drawing Sheets

FIG. 4

| | FLAG | |
|---|---|---|
| FOCUS HTML INPUT FIELD | ON or OFF | F1 |
| SOFT KEYBOARD DISPLAY | ON or OFF | F2 |
| DIAL KEY/BROWSER INPUT DUAL FUNCTION | ON or OFF | F3 |
| DIAL KEY INPUT MODE 〔NUMBER〕 | ON or OFF | F4 |
| DIAL KEY INPUT MODE 〔ALPHABET〕 | ON or OFF | F5 |
| DIAL KEY INPUT MODE 〔HIRAGANA〕 | ON or OFF | F6 |
| DIAL KEY INPUT MODE 〔KATAKANA〕 | ON or OFF | F7 |
| DIAL KEY INPUT MODE 〔KANJI〕 | ON or OFF | F8 |

# COMMUNICATION TERMINAL APPARATUS AND COMMUNICATION TERMINAL APPARATUS CONTROL METHOD

BACKGROUND OF THE INVENTION

1. Field of the Invention

The present invention relates to communication terminal apparatus equipped with a display and methods for controlling these communication terminal apparatus.

2. Description of the Related Art

Recently, in line with the widespread use of the Internet, clients having a WWW browser function access a WWW server and browse HTML documents. These clients include personal computers (hereinafter referred to as "PC") and personal digital assistants (hereinafter referred to as "PDA")

Some clients have a touch panel display rather than a keyboard. Clients of this type are usually designed to use a soft keyboard to enter characters in input fields of an HTML document displayed on a screen. The input modes of characters are switched by the soft keyboard between alphabet, number, hiragana, katakana, kanji, etc.

However, conventional communication terminal apparatuses require complicated operations involving the need to start the soft keyboard every time characters are entered in the input fields of HTML documents or the need to change input modes, etc. Moreover, once the soft keyboard is started, the screen is occupied by the soft keyboard, reducing the visible space of the HTML documents.

SUMMARY OF THE INVENTION

It is an first objective of the present invention to provide a communicaton terminal apparatus that will allow characters to be entered in the input fields of hypertexts only by simple operations.

It is an second objective of the present invention to provide a method of controlling communication terminal that will allow characters to be entered in the input fields of hypertexts only by simple operations.

The above objective is achieved by a communication terminal apparatus, comprising display section for displaying information; hypertext browsing section for analyzing hypertexts and displaying a screen according to the analysis result on said display section; pointing section for pointing arbitrary positions on said screen; call section for making a call over a line; hardware key section for entering call numbers to said call section; and controlling section for controlling said hardware key section, wherein said controlling section switches, when the position pointed by said pointing section is within an input field of said hypertext, the output destination of said hardware key section from said call section to said hypertext browsing section, allowing inputs from said hardware key section to said input field.

The above objective is achieved by a communication terminal apparatus, comprising: call section for making a call over a line; handset section for inputting or outputting voice attached to the apparatus in a detachable manner; display section for displaying information attached to the apparatus in such a way that the angle of elevation of the screen can be changed; hypertext browsing section for analyzing a hypertext and displaying a screen according to the analysis results on said display section; pointing section for pointing arbitrary positions on said screen; hardware key section for entering call numbers to said call section; and controlling section for controlling said hardware key section, wherein said controlling section switches, when the position pointed by said pointing section is within an input field of said screen, the output destination of said hardware key from said call section to said hypertext browsing section, allowing inputs from said hardware key section to said input field.

The above objective is achieved by a communication terminal apparatus, comprising: call section for making a call over a line; display section for displaying information attached to the apparatus in such a way that the angle of elevation of the screen can be changed; hardware key section for entering call numbers to said call section; and display controlling section, wherein said display controlling section displays, when the angle of elevation of said display section is changed and said hardware key section is covered, a call number input screen for entering call numbers to said screen, and on the other hand displays, when said hardware key section is not covered with said display section, an input result display screen for displaying said call numbers input on said screen by said hardware key section.

The above objective is achieved by a facsimile apparatus, which scan documents, obtains image data and transmits said image data according to a facsimile protocol, comprising: information displaying section; hypertext browsing section for analyzing a hypertext and displaying a screen according to the analysis results on said display section; pointing section for pointing arbitrary positions on said screen; call section for making a call over a line; and hardware key section for entering call numbers to said call section, wherein said controlling section switches, when the position pointed by said pointing section is within an input field of said hypertext, the output destination of said hardware key section from said call section to said hypertext browsing section, allowing inputs from said hardware key section to said input field.

The above objective is achieved by a facsimile apparatus, which scans documents, obtains image data and transmits said image data according to a facsimile protocol, comprising: call section for making a call over a line; handset section for inputting or outputting voice attached to the apparatus in a detachable manner; display section for displaying information attached to the apparatus in such a way that the angle of elevation of the screen can be changed; hypertext browsing section for analyzing a hyper text and displaying a screen according to the analysis results; pointing section for pointing arbitrary positions on said screen; hardware key section for entering call numbers to said call section; and controlling section for controlling said hardware key section, wherein said controlling section switches, when the position pointed by said pointing section is within an input field of said screen, the output destination of said hardware key section from said call section to said hypertext browsing section, allowing inputs from said hardware key section to said input field.

The above objective is achieved by a facsimile apparatus, which scans documents, obtains image data and transmits said image data according to a facsimile protocol, comprising: call section for making a call over a line; display section for displaying information attached to the apparatus in such a way that the angle of elevation of the screen can be changed; hardware key section for entering call numbers to said call section; display controlling section for displaying, when the angle of elevation for said display section is changed and said hardware key section is covered, a call number input screen for entering call numbers to said screen, and displaying, when said hardware key section is not covered with said display section, an input result display screen for displaying said call numbers input on said screen by said hardware key section.

The above objective is achieved by a communication terminal apparatus, comprising: a display for displaying information; a browser for analyzing a hypertext and displaying the analysis results on said display; a pointing device for painting arbitrary positions on said screen; a line control circuit for making a call over a line; hardware keys for entering call numbers to said line control circuit and a controller for controlling the output destination of inputs from said hardware keys, wherein said controller switches, when the position pointed by said pointer is within an input field of said hypertext, the output destination of said hardware keys from said line control circuit to said browser, allowing inputs from said hardware keys to said input field.

The above objective is achieved by a method of controlling hardware keys of a communication terminal apparatus comprising display and line control circuit, comprising the steps of: detecting a position pointed by the pointer on a screen displayed on the display using a browser; and switching, when said detected position is within an input field of said hypertext, the output destination of said hardware keys from said line control circuit to said browser, allowing inputs from said hardware keys to said input field.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4 is a setting table used for the facsimile apparatus according to the embodiment above;

DETAILED DESCRIPTION OF THE PREFERRED EMBODIMENTS

With reference now to the attached drawings, a communication terminal apparatus according to an embodiment of the present invention is explained in detail below.

Figure 1:
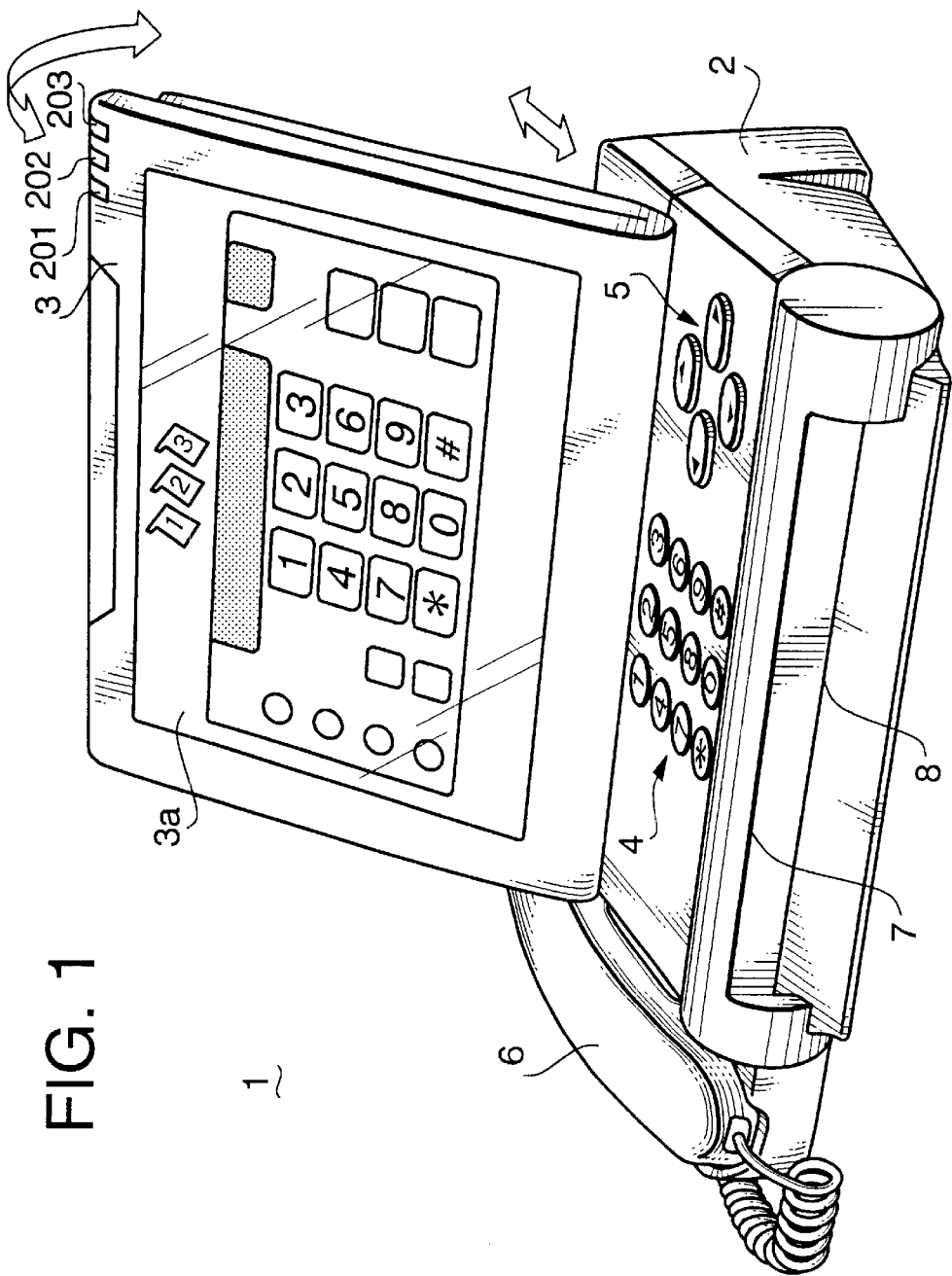
FIG. 1 is a perspective view showing a facsimile apparatus according to an embodiment of the present invention.

FIG. 1 is a perspective view of a facsimile apparatus according to an embodiment of the present invention.

On the top panel of main body 2 of facsimile apparatus 1, a touch panel display 3 is attached in a manner that it can freely be opened/closed. Touch panel display 3 is attached to main body 2 in a manner that the angle of elevation of screen 3a can freely be changed. More specifically, touch panel display 3 is designed to be able to take either a first posture with screen 3a facing upward or a second posture with screen 3a in an upright position. Touch panel display 3 can change its angle of elevation continuously between the first posture and second posture.

On the top panel of main body 2, a dial keys 4 and cursor keys 5 are provided. Cursor keys 5 are a directional section to freely move the cursor and pointer displayed on screen 3a in 4 directions. Dial keys 4 and cursor keys 5 are covered with touch panel display 3 when it is laid on the top panel as described above.

On one side of main body 2, a handset 6 is provided. This example shows a case where a receiver with a cord is used as handset 6, but a cord-less receiver can also be used. On the front of main body 2, a scanner paper feeding section 7 and a printer paper discharge section 8 are provided.

Figure 2:
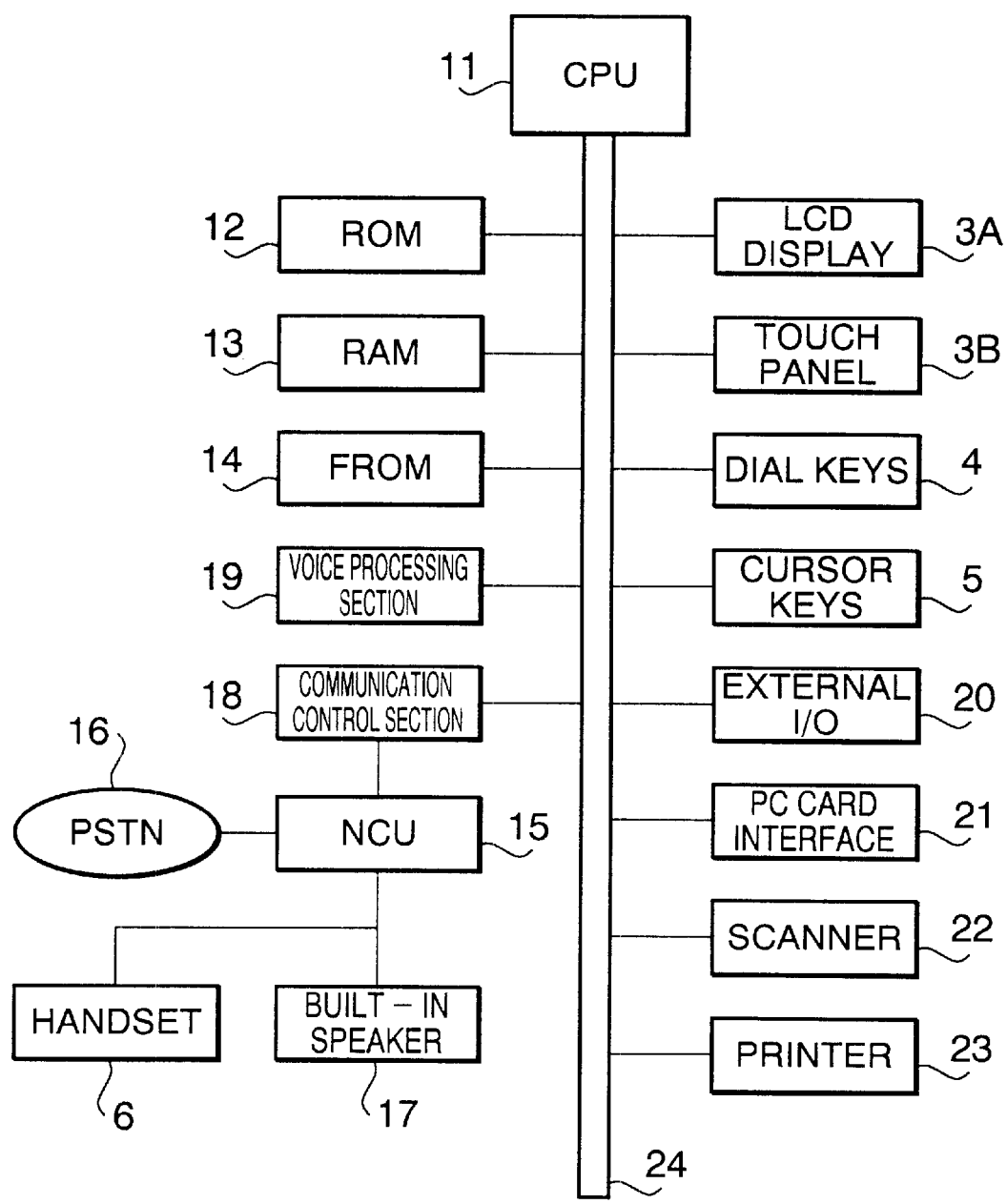
FIG. 2 is a hardware block diagram of the facsimile apparatus according to the embodiment above.

FIG. 2 is a hardware block diagram of facsimile apparatus 1 according to the embodiment above.

Touch panel display 3 consists of LCD display 3A and touch panel 3B.

CPU (Central Processing Unit) 11 executes desired processing according to a program.

ROM 12 is a read only memory which stores basic programs such as a startup program.

RAM (Random Access Memory) 13 is a main memory into which CPU 11 loads and executes a program or data.

Flush memory (hereinafter referred to as "FROM") is an erasable and rewritable non-volatile semiconductor memory. FROM 14 mainly stores application programs, executable programs and data such as HTML documents.

Network control unit (hereinafter referred to as "NCU") 15 controls transmission/reception of a signal to/from Public Switched Telephone Network (hereinafter referred to as "PSTN") 16. NCU 15 processes outgoing and incoming calls, etc. This NCU 15 is connected with handset 6 and built-in speaker 17.

Communication control section 18 performs data communications and facsimile communications via PSTN 16. This example shows a facsimile modem, but a DSU or terminal adapter (TA) can also be used. The facsimile modem also performs digitization of voice signals together.

Voice processing section 19 encodes and compresses a digitized voice signal or, inversely, decodes and decompresses a compressed voice signal.

Touch panel display 3 consists of an LCD panel display as a display section and a touch panel as an input device. Therefore, touch panel display 3 not only displays information but also accepts user operations. More specifically, screen 3a of touch panel display 3 displays various kinds of information, input screens, operation menus, icons and buttons, etc. Touching screen 3a with a pen or finger makes it possible to enter characters or pictures and select menus, etc.

Dial keys 4 are used not only for telephone dial operations but also for entering numbers, etc. in input fields displayed on touch panel display 3.

External I/O 20 controls data communications with external devices such as a PC, TA, barcode reader, and external modem. External I/O 20 is, for example, a serial interface, a parallel interface, IEEE (Institute of Electrical and Electronic Engineers) 1394 or USB (Universal Serial Bus).

PC card interface 21 controls data transmission/reception between a PC card and the main body 2. For PC cards, a variety of cards such as flush memory cards, modem cards, LAN cards and ISDN cards are available.

Scanner 22 scan documents. Printer 23 prints out various kinds of data such as images and text.

Bus 24 is a line that connects CPU 11 and other sections such as ROM 12 and RAM 13.

Figure 3:
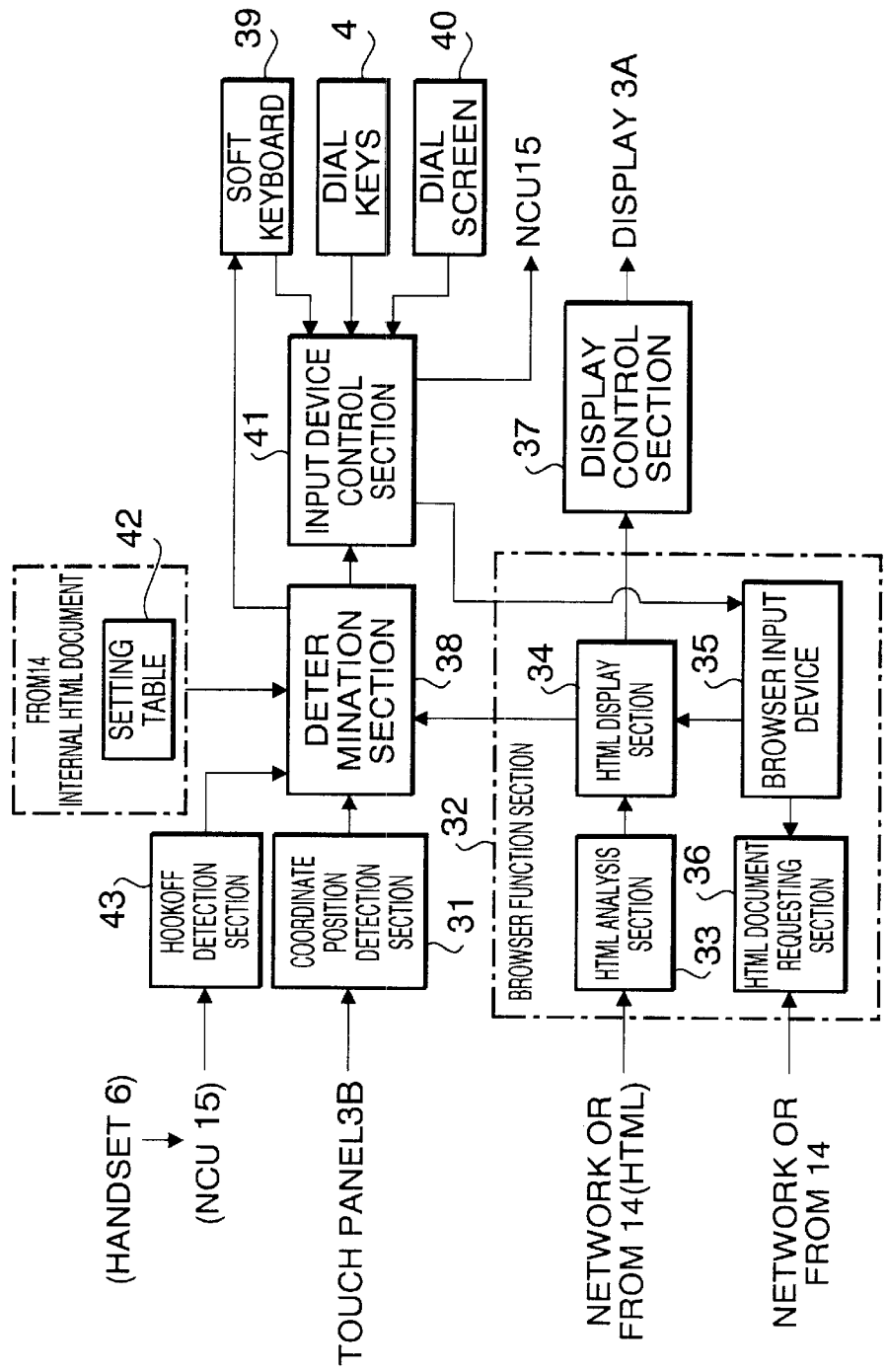
FIG. 3 is a functional block diagram of the facsimile apparatus according to the embodiment above.

FIG.3 is a functional block diagram showing facsimile apparatus 1 according to the embodiment above.

Coordinate position detection section 31 detects coordinates on the screen of display 3A (hereinafter referred to as "pointing coordinates") of the position on touch panel 3B that a pen or finger touches (hereinafter referred to as "focus").

Facsimile apparatus 1 according to the present embodiment comprises browser function section 32. This browser function section 32 has functions compliant with the HTTP (Hyper Text Transfer Protocol) standard.

More specifically, HTML analysis section 33 analyzes HTML documents read from, for example, a WWW server on the network or internal HTML documents read from FROM 14.

HTML display section 34 outputs display data according to the analysis result from HTML analysis section 33.

Browser input device 35 receives inputs to the browser function such as URL inputs, link destination inputs, inputs to HTML document input fields and performs processing according to these inputs.

HTML document requesting section 36 requests a WWW server to transfer an HTML document in response to an input to browser input device 35 according to HTTP. HTML document requesting section 36 also reads internal HTML documents stored in FROM 14.

The display data output from HTML display section 34 above are displayed by display control section 37 on LCD display 3A.

Determination section 38 receives pointing coordinates from coordinate position detection section 31, and it also receives coordinates of an input field (hereinafter referred to as "input field coordinates") in a HTML document from HTML display section 34. Through this, determination section 38 determines whether or not pointing coordinates are within the input field coordinates.

Soft keyboard 39 is an input device for entering symbols and numbers, hiragana, katakana, kanji, displayed on LCD display 3A.

Dial screen 40 is a screen containing the dial that is displayed on LCD display 3A according to an internal HTML document and used to enter telephone numbers. Touching the dial section allows operations equivalent to dial keys 4.

Input device control section 41 sends inputs from dial keys 4, soft keyboard 39 and dial screen 40 to browser input device 35 and communication control section 18 based on the determination by determination section 38.

Setting table 42 stores various setting contents of facsimile apparatus 1 according to the present embodiment. As show in FIG.4, flag F1 is set to ON when the focus is in an input field of the HTML document. Flag F2 is set to ON when soft keyboard 39 is requested to be displayed. Flag 3 is set to ON when dial keys 4 are also used for browse inputs. Moreover, flags F4 to F8 are set to ON according to the type of the soft keyboard input mode. Determination section 38 determines the transmission destination of the input of the input device taking account of flags in setting table 42.

Hookoff detection section 43 detects a hook off of handset 6 via communication control section 18 and informs it to determination section 38.

Figure 5:
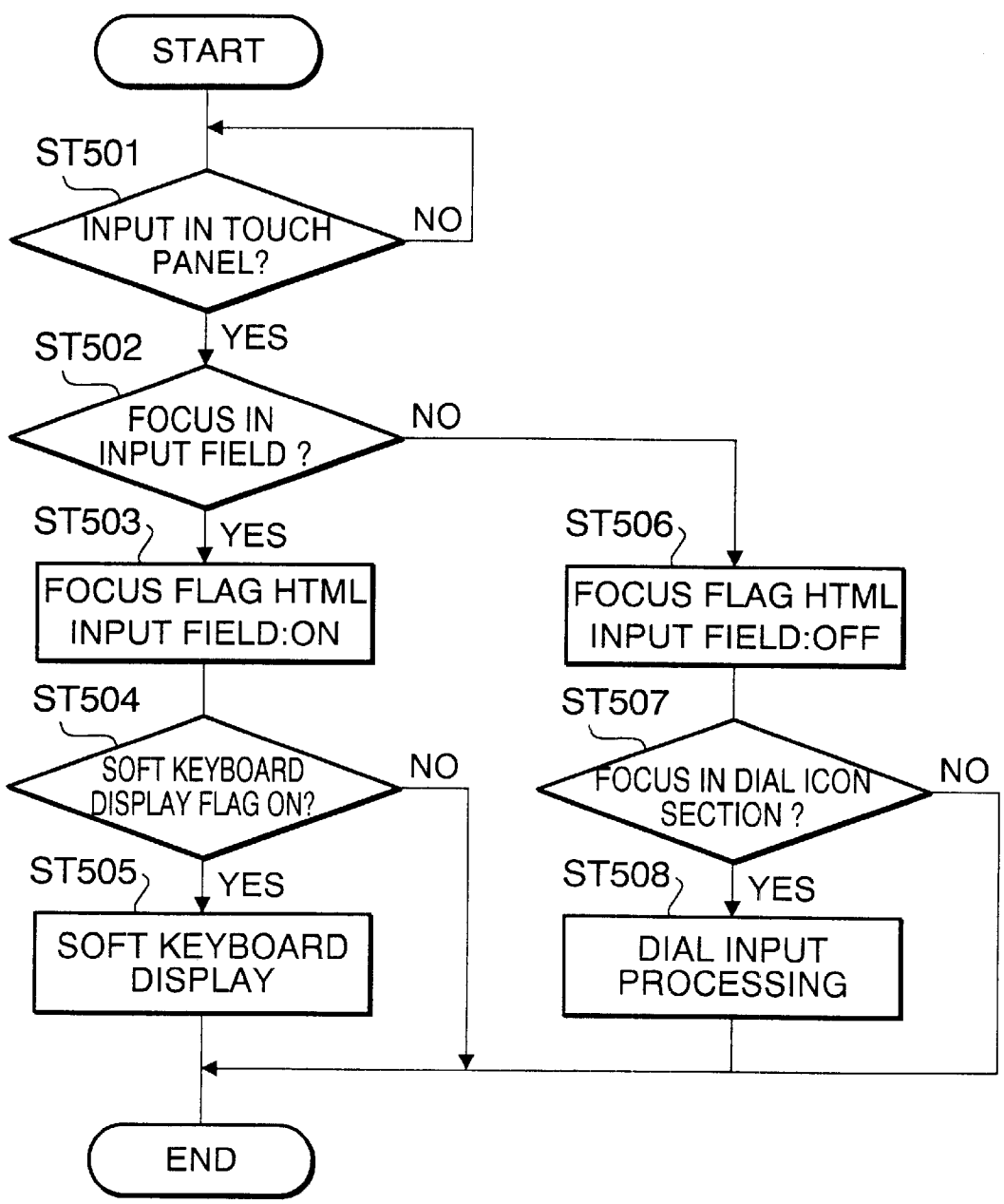
FIG. 5 is a flow diagram showing steps of control when a contact has been made on the touch panel in the facsimile apparatus according to the embodiment above.

Then the operation of facsimile apparatus 1 as shown above is explained. FIG. 5 is a flow diagram showing steps of control when a touch is produced on touch panel 3B of facsimile apparatus 1 according to the embodiment of the present invention.

In step (hereinafter referred to as "ST") 501, determination section 38 checks whether or not there is an input to touch panel 3B, that is, determination section 38 checks whether or not there is a contact by a pen or finger.

If there is an input, in ST502 determination section 38 checks whether or not the focus is in an input field of the HTML document. More specifically, determination section 38 checks whether or not the focus is in the input field on the screen specified by an INPUT tag of the HTML document.

If the focus is found in the input field in ST502, the "focus HTML input field" flag F1 of setting table 42 shown in FIG. 4 is set to ON in ST503.

Then, in ST504, determination section 38 checks whether the "soft keboard display" flag F2 in setting table 42 is ON or OFF. If it is ON, soft keyboard 39 is displayed on the screen in ST505.

Figure 6A:
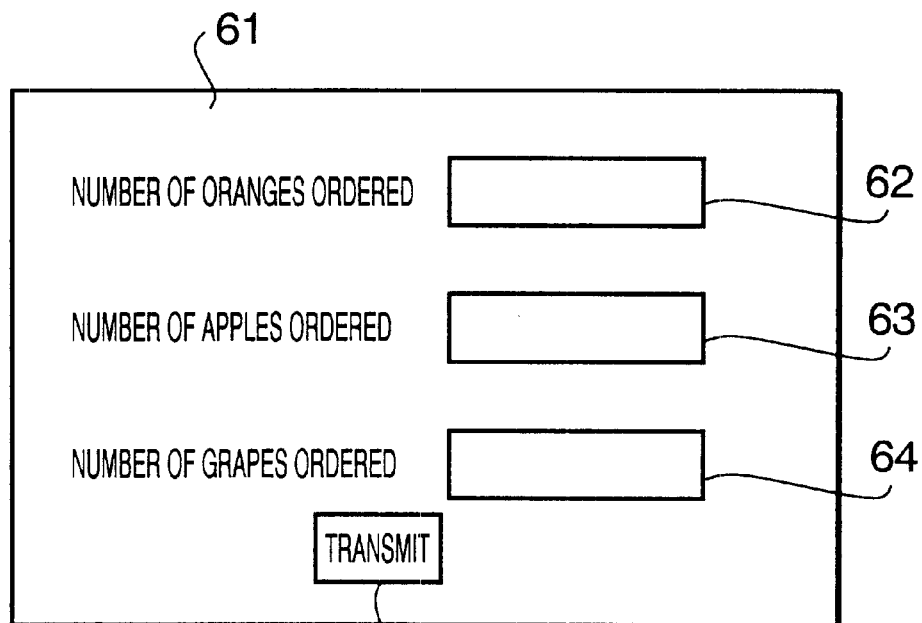
FIG. 6A is a drag showing an example of screen which includes input fields of the facsimile apparatus according to the embodiment above.
Figure 6B:
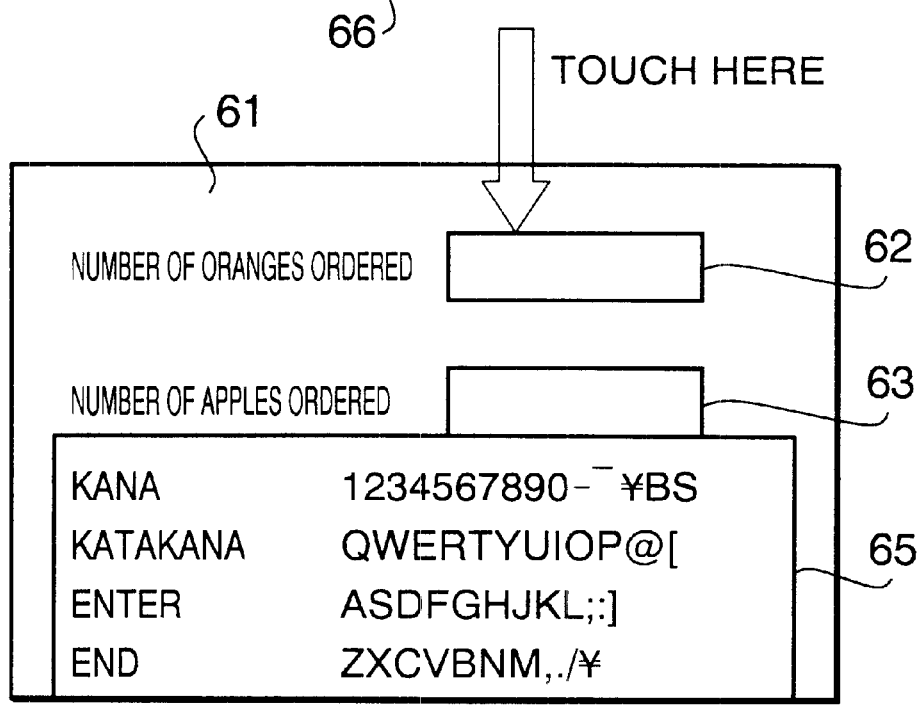
FIG. 6B is a drawing showing an example of screen which displays a soft keyboard according to the embodiment above.

FIG. 6A is a drawing showing an example of screen containing the input device of facsimile apparatus 1 according to the embodiment of the present invention. FIG. 6B is a drawing showing an example of screen on which the soft keyboard is displayed. On screen 61, a plurality of input fields 62 to 64 specified by INPUT tags in the HTML document are displayed. If the focus is in one of input fields 62 to 64, soft keyboard 65 is displayed as shown in FIG. 6B.

Here, inputs by soft keyboard 65 are explained using FIG. 6A and FIG. 6B. The screen shown in FIG. 6A is a screen for ordering oranges apples and grapes.

An ordering operation is completed by the operator entering the numbers of ordering items and then touching transmission button 66. Input fields 62 to 64 next to the numbers of ordering items are described with INPUT tags. Touching these input fields 62 to 64 displays soft keyboard 65 as shown in FIG. 6B. For example, if the operator wants to enter "12", the operator needs to touch "1", "2" and "End" on soft keyboard 65, in that order.

On the other hand, if the focus is not in the input field in ST502, the "focus HTML input field" flag F1 in setting table 42 is sot to OFF in ST506. Then, in ST507, determination section 38 determines whether or not the focus is in the dial icon section of dial screen 40.

If the focus is on a dial icon in ST507, dial input processing is performed in ST508. More specifically, each of the dial icon of dial screen 40 corresponds to a number or a symbol (*, #). Therefore, the operator can enter data of the corresponding numbers or symbols in input device control section 41 by touching any dial icon with a finger or a pen. The input data are sent by input device control section 41 to communication control section 18 as telephone dial data.

Figure 7:
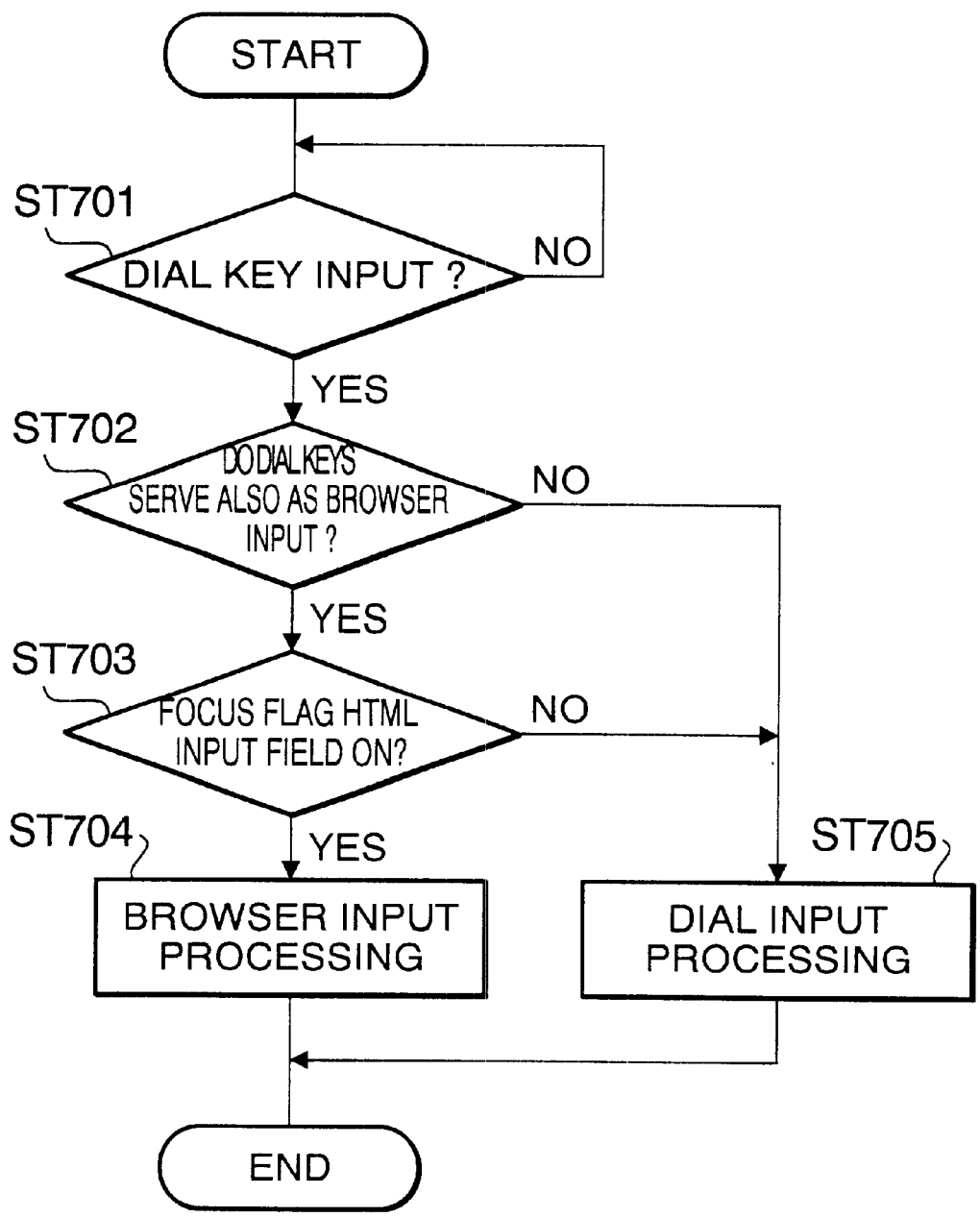
FIG. 7 is a flow diagram showing steps of control when dial keys are pressed in the facsimile apparatus according to the embodiment above.

Then, a case where dial keys 4 are pressed in facsimile apparatus 1 according to the present embodiment is explained. FIG. 7 is a flow diagram showing steps of control when dial keys 4 are pressed in facsimile apparatus 1 according to the embodiment of the present invention.

In ST701, determination section 38 checks whether or not dial keys 4 have been pressed. If dial keys 4 are pressed, in ST702, determination section 38 checks whether or not the "dial key/browser input dual-function" flag F3 is ON in setting table 42.

If it is ON, it checks whether or not "Focus HTML input field" flag F1 is ON in ST703. If it is ON, determination section 38 determines that the input data of dial keys 4 be subjected to browser input processing. More specifically, if one of dial keys 4 is pressed, the number or symbol assigned to the relevant key is entered. These input data are sent by input device control section 41 to browser input device 35 of browser function section 32.

On the other hand, in ST702, if the dial key/browser input dual-function flag F3 is OFF, in ST705, determination section 38 determines that the dial keys be used for dial input processing. More specifically, if one of dial keys 4 is pressed, the number or symbol assigned to the relevant key is input to input device control section 41. The input data are sent to communication control section 18 by input device control section 41 as telephone dial data.

In ST703, if the focus HTML input field flag F1 is OFF, in ST705, determination section 38 determines likewise that the dial 1 keys be used for dial input processing.

As described above, according to the present embodiment, if the focus is in an input field of the HTML document, the input data from dial keys 4 are sent to browser input device 35 of browser function section 32. This allows the dial keys 4 to be used also for browser input. That is, hard keys used exclusively for entering call numbers can also be used for inputs to hypertexts , i.e. hypertexts, such as html documents. Therefore, the operability in entering data in the browser can improve for operators who would feel it easier to enter data from dial keys 4 than soft keyboard 39. This is because this embodiment can provide those who are unfamiliar with operations of the soft keyboard with operations with the hard keys which are conventionally more familiar.

The use of dial keys 4 without soft keyboard 39 being displayed prevents the screen of LCD display 3B from being occupied by soft keyboard 39, without reducing the display area. This prevents input fields of HTML documents from being hidden.

The simultaneous use of dial keys 4 also for browser inputs and display of soft keyboard 39 are determined according to the content of setting table 42. Thus, dial keys 4 or soft keyboard 39 can be selected and used according to the operator's preferences. The switching between the two is also automatically performed and the operator need not be aware of it.

Figure 8:
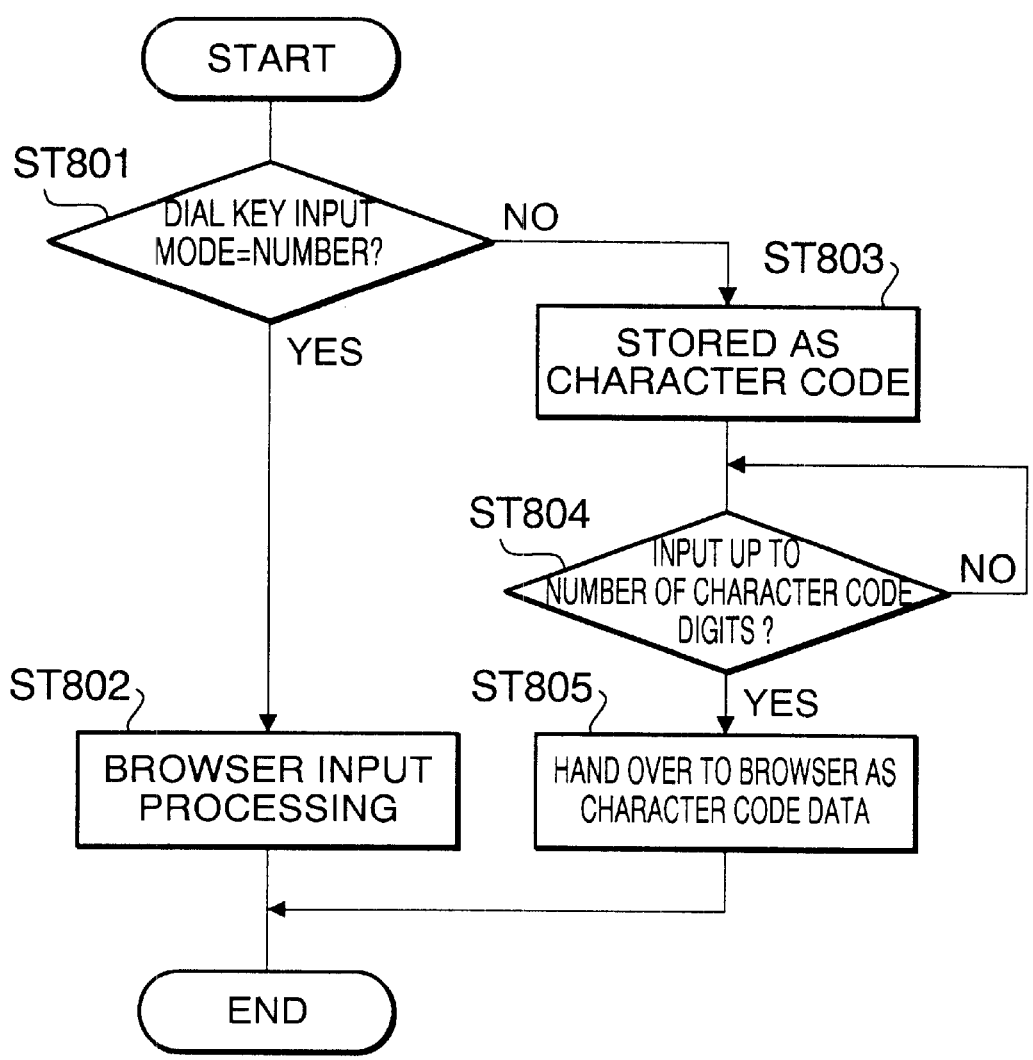
FIG. 8 is a flow diagram showing steps of control by an input device according to the input mode of the dial keys in the facsimile apparatus according to the embodiment above.

Then, in facsimile apparatus 1 according to the present embodiment, control of the input device according to the input mode of the dial keys is explained. FIG. 8 is a flow diagram showing steps of control of the input device in facsimile apparatus 1 of the present embodiment according to the dial key input mode.

Facsimile apparatus 1 according to the present embodiment can enter hiragana, katakana and alphabetic characters using dial keys 4. It also has a function to convert hiragana and katakana characters entered to kanji characters. For example, kanji conversion is performed by pressing down the "*" and "#" keys after entering hiragana characters, etc. The input modes of dial keys 4 are switched by assigning a mode change function to the "*" or "#" key, for example, and pressing them.

In ST801, determination section 38 checks based on the dial key/input mode flags in setting table 42 whether or not the input mode of dial keys 4 is numeric.

If the input mode is numeric, in ST802, determination section 38 determines that the input data of dial keys 4 be subjected to browser input processing. More specifically, when one of dial keys 4 is pressed, the number or symbol assigned to the relevant key is input to input device control section 41. These input data are sent to browser input device 35 of browser function section 32 by input device control section 41.

On the other hand, in ST801, if the input mode of dial keys 4 is not numeric, when one of dial keys 4 is pressed in ST803, the number assigned to the relevant key is stored in RAM 13 as the 1st digit of a character code. In the same way, the numbers input from dial keys 4 are stored one by on . In ST804, it is checked whether or not numbers have been entered up to the number of digits of the character codes. If numbers have been entered up to the number of digits of the prescribed character codes, in ST805, the numbers stored in RAM 13 are handed over to browser input device 35 as character codes. The character codes are converted to the corresponding characters by a conversion function incorporated in input device control section 41.

As shown above, according to the present embodiment, dial keys 4 can enter not only numbers but also alphabetic characters, hiragana, katakana, and kanji.

Figure 9:
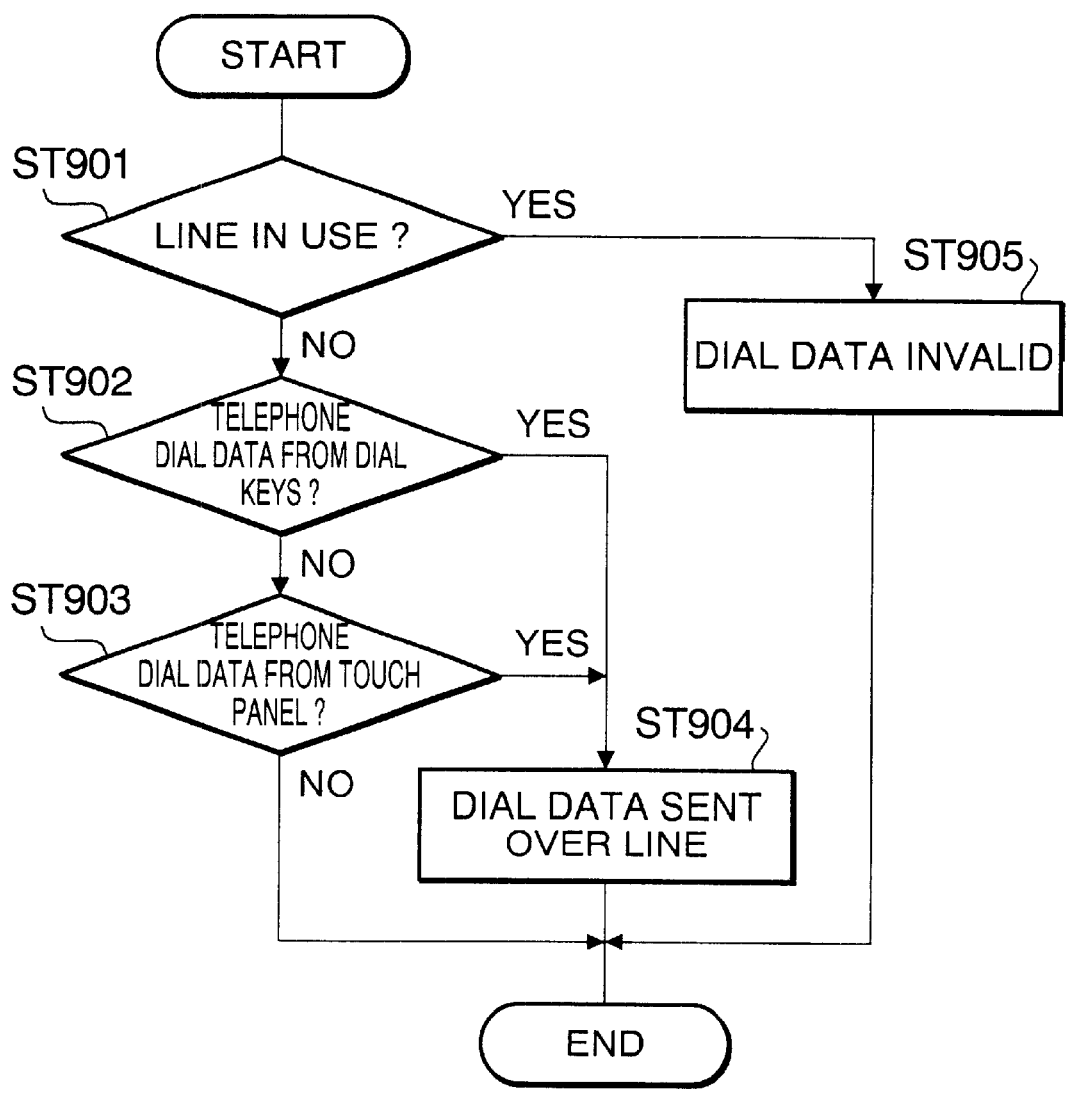
FIG. 9 is a flow diagram showing steps of dial input processing in the facsimile apparatus according to the embodiment above.

Then, details of dial input processing are explained. FIG. 9 is a flow diagram showing steps of dial input processing in facsimile apparatus 1 according to the present embodiment.

In ST901, determination section 38 determines whether or not PSTN 16 is being used. If it is not used, in ST902, input device control section 41 checks whether or not there are telephone dial data from dial keys 4.

In ST902, if data from dial keys 4 are not telephone dial data, in ST903 determination section 38 checks whether or not there are dial icons of dial screen 40, that is, telephone dial data from touch panel 3B.

In ST902 and ST903, if there is any entry of telephone dial data, in ST904, determination section 38 instructs communication control section 18 to send the telephone dial data to PSTN 16. Here, the telephone dial data can be sent to PSTN 16 one by one or all telephone dial data can be stored temporarily in RAM 13 and then sent altogether to PSTN 16 when handset 6 is off-hooked.

On the other hand, in ST901, if PSTN 16 is in use and, in ST904, no telephone dial data from both touch panel 3B and dial key 4 are sent, inputs from touch panel 3B and dial keys 4 are ignored and the telephone dial data disabled in ST905.

As shown above, the present embodiment allows dial inputs from both touch panel 3B and dial keys 4. Thus, if it is difficult for the operator to see dial keys 4 or operate them due to a certain angle of elevation of touch panel display 3, the operator can perform dial inputs from dial score 40. Furthermore, telephone dial data are sent to PSTN 16 only when PSTN 16 is not in use, which will prevent call processing from being mistakenly executed during a call.

Figure 10:
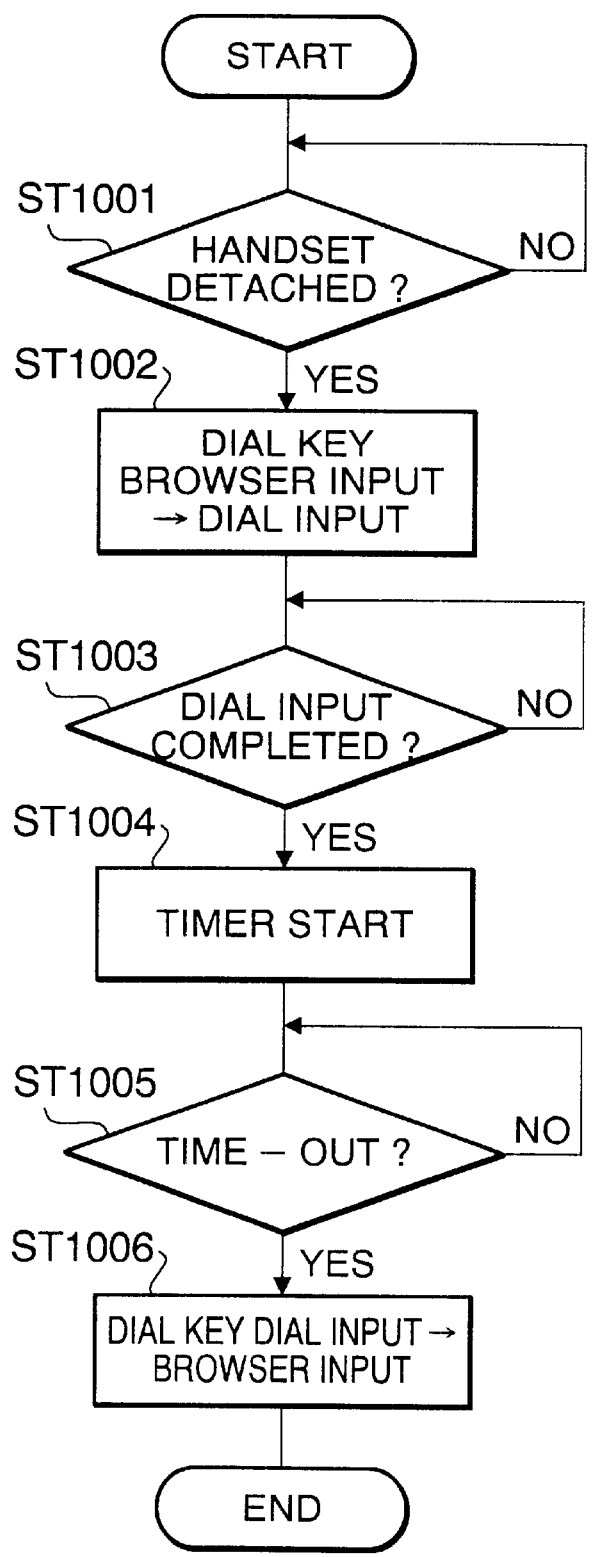
FIG. 10 is a flow diagram showing steps of dial input processing in the facsimile apparatus according to the embodiment above.

Then, dial input processing is explained in detail. FIG. 10 is a flow diagram showing steps of dial input processing in facsimile apparatus 1 according to the present embodiment.

As shown above, if the operator browses a HTML document and moves the focus to an input field of the HTML document, the input mode of dial keys 4 is switched from dial input to browser input. Control of the input device when handset 6 is detached in this state is performed as follows.

First, in ST1001, determination section 38 checks whether or not handset 6 is detached. This checking is performed by hook-off detection section 43 detecting that NCU 15 has been connected to PSTN 16 due to detachment of handset 6.

When handset 6 is detached, in ST1002, determination section 38 instructs input device control section 41 to switch the transmission destination of the input data from browser input device 35 to communication control section 18.

In ST1003, determination section 38 checks whether or not dial input is completed. When dial input is completed, determination section 38 starts the timer in ST1004. After confirming that a given time has elapsed in ST1005, determination section 38, in ST1006, instructs input device control section 41 to return the transmission destination of the input data from dial keys 4 from communication control section 18 to browser input device 35.

As shown above, according to the present invention, the output destination of the dial keys 4 can automatically return from the communication control section 18 to the browser input device 34. Therefore, the operator can perform dial inputs and browser inputs using dial keys 4 without being aware of it at all.

Furthermore, when a given time has elapsed after the entry of a call number from dial keys 4 was completed, the output destination of dial keys 4 is returned from communication control section 18 to HTML input field 35. Thus, after a communication is established, entries can be made to the HTML documents again. The operator need not be aware of the restoring process, either.

The present invention allows dial keys 4 to be used also for browser inputs and for entering characters and symbols other than numbers. Therefore, it is preferable to indicate whether dial keys 4 are to be used also for browser inputs or exclusively for dial inputs, and display the input mode of dial keys 4 on the screen to allow the operator to grasp it at first sight.

More specifically, according to the results of checking performed by determination section 38 in ST702 of the flow diagram in FIG. 7, icons, etc. are displayed on the screen of LCD display 3A or separately provided LED lamps are lit to indicate whether or not dial keys 4 are used also for browser inputs. For example, as shown in FIG. 1, at the top right of touch panel display 3 is browser input LED 203 for indicating whether or not dial keys 4 are used also for browser inputs, next to power supply LED 201 and answering LED 202 for showing ON/OFF of the automatic message recording function.

Furthermore, in ST801 shown in FIG. 8, determination section 38 determines the input mode of dial keys 4, checking whether it is numeric or character code and based on this result it displays the input mode on LCD display 3A using icons or characters, etc.

Facsimile apparatus 1 according to the present embodiment can freely change the angle of elevation of touch panel display 3 as shown above. Depending on the angle of elevation, dial keys 4 may be hidden behind touch panel display 3, for example, when touch panel display 3 is laid with its screen facing upward.

Figure 11A:
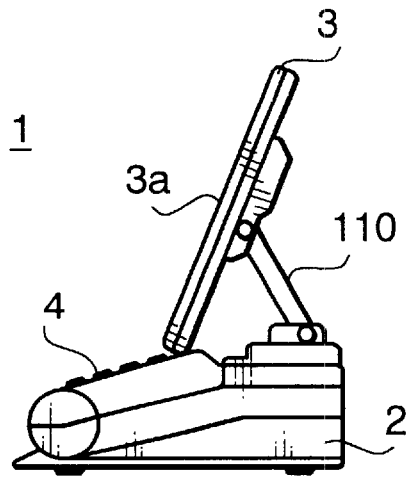
FIG. 11A is a drawing showing transition status 1 of angle adjustment of the touch panel display of the facsimile apparatus according to the embodiment above.
Figure 11B:
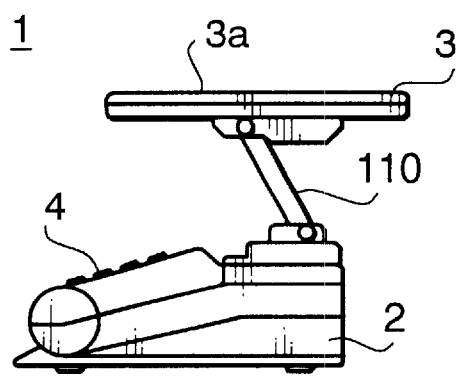
FIG. 11B is a drawing showing transition status 2 of angle adjustment of the touch panel display of the facsimile apparatus according to the embodiment above.
Figure 11C:
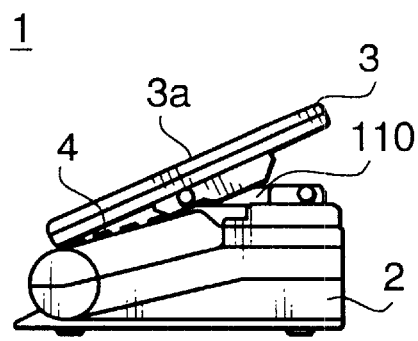
FIG. 11C is a drawing showing transition status 3 of angle adjustment of the touch panel display of the facsimile apparatus according to the embodiment above.
Figure 12A:
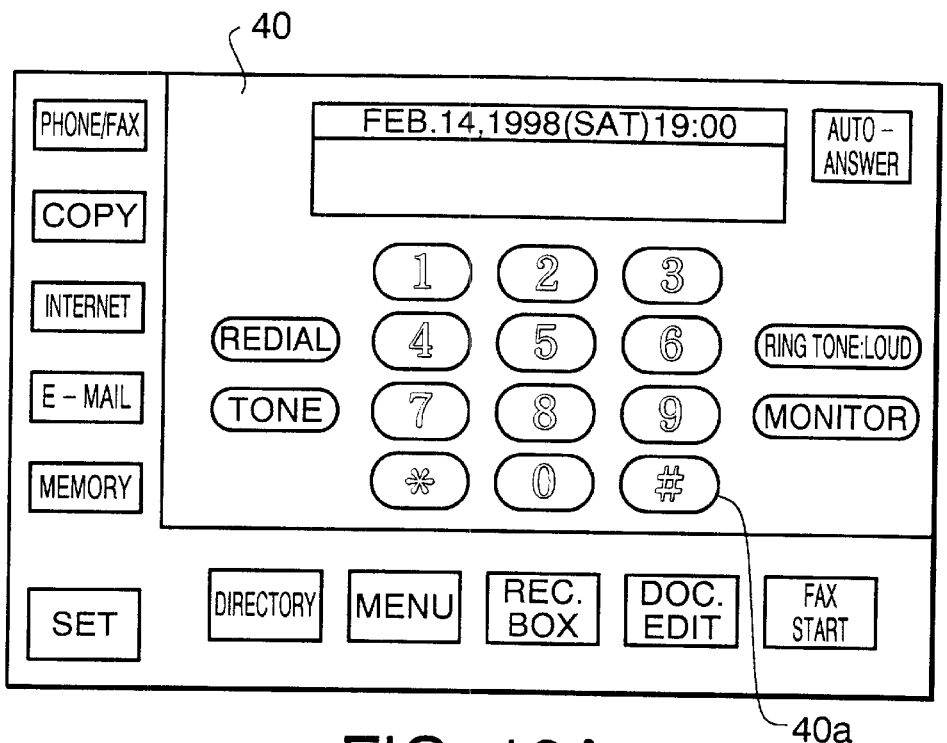
FIG. 12A is a drawing showing an example of dial screen of the facsimile apparatus according to the embodiment above; an FIG. 12B is a drawing showing an example of input result display screen.
Figure 12B:
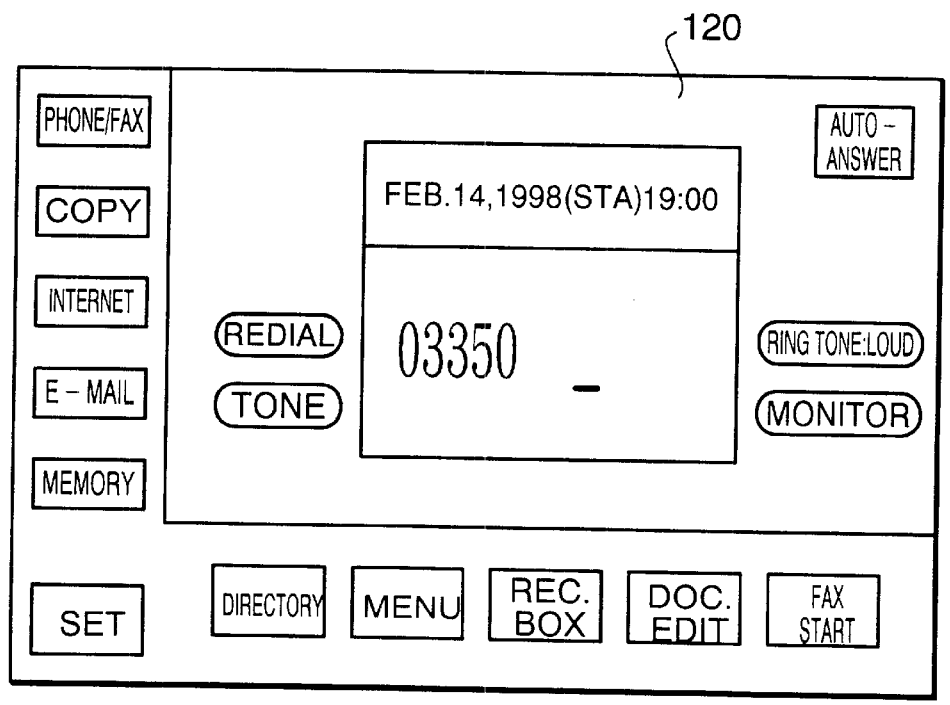

FIG. 11A to FIG. 11C are drawings showing transition of angle adjustment of the touch panel display of facsimile apparatus according to the present embodiment. As shown in FIG. 11A, touch panel display 3 is attached to main body 2 via hinge section 110. Hinge section 110 is connected with touch panel display 3 at junction 110a and with main body 2 at junction 110b in a pivotable manner. Therefore, the operator can change touch panel display 3 from a first upright posture with screen 3a facing forward as shown in FIG. 11A to a position with screen 3a facing upward as shown in FIG. 11B by raising the bottom of touch panel display 3. Then, the operator can change touch panel to display 3 in a second posture with screen 3a facing upward and covering main body 2 as shown in FIG. 11C by pressing touch panel display 3 downward. With the second posture, dial keys 4 on main body 2 are hidden. In this case, dial screen 40 as shown in FIG. 12A is used. However, when dial keys 4 are available, for example, when the screen is in an upright position, dial screen 40 does not require dial icon section 40a. In such a case, as shown in FIG. 12B, the screen is switched to input result display screen 120 with no dial icon section, giving an enlarged view of the input result of dial keys 4 to improve visibility.

Switching of screens may carried out when a sensor attached to hinge section 110 of touch panel display 3 detects that touch panel display 3 has exceeded a given angle of elevation.

The present invention is not particularly limited to the above embodiment. For example, a facsimile apparatus was taken as an example to explain the above embodiment, but the present invention can also include telephones without a facsimile communication function, that is, telephones with an Internet communication function without a printer or scanner. Telephones here include all kinds of communication modes such as portable telephones, PHS, an Internet telephones.

Moreover, a touch panel display was taken as an example to explain the above embodiment, but the LCD display and touch panel can also be configured separately. Furthermore, an LCD display was taken as an example of display section for the above embodiment, but the display section can also include a CRT display and others. Cursor keys were taken as an example of pointing section for the above embodiment, but the pointing section can also be made up of track ball, mouse on the like.

The present invention is not limited to the above described embodiments, and various variations and modifications may be possible without departing from the scope of the present invention.

This application is based on the Japanese Patent Application No.HEI 1-354897 filed on Dec. 14, 1998, entire content of which is expressly incorporated by reference herein.

What is claimed is:

1. A communication terminal apparatus, comprising:
   a communication section that control communication to a destination via a line;

a display section that displays hypertexts transmitted from the destination, the hypertexts having a plurality of input fields;

hardware keys selectively operable in a first mode to input a destination number to said communication section in order to communicate with the destination, and in a second mode to input data to the input fields of the hypertexts;

software keys operable to input data to the input fields of the hypertexts, said software keys being displayed on a screen of said display section;

a control device that controls an input position of data, in the display section, by said hardware and software keys;

a table that stores at least a first flag and a second flag, the first flag indicating that said hardware keys are usable to input data to the input fields and the second flag indicating that said software keys are usable to input data to the input fields;

a control section that controls input of the data by each of said hardware keys and said software keys and controls a status of said hardware keys in one of said first and second modes;

wherein said control section cortrols said hardware keys, when the first flag indicates that said hardware keys are usable and the input position is in the input fields of the hypertexts, to input data to the input fields of the hypertexts, and controls said software keys, when the second flag indicates said software keys are usable and the input position is in the input fields of the hypertexts, to input the data to the input fields of the hypertexts;

wherein said control section, upon detection of an off-hook condition of a handset associated with said apparatus, controls said hardware keys to enter into the first mode to input a destination number to said communication section.

2. The communication terminal apparatus according to claim 1, said control device comprising a plurality of cursor keys.

3. The communication terminal apparatus according to claim 1, said control section, upon occurrence of a predetermined condition after detection of the off-hook condition, controls said hardware keys to enter into said second mode.

4. The communication terminal apparatus according to claim 1, said display section being adjustably mounted with respect to a body of said apparatus.

5. The communication terminal apparatus according to claim 1, said display section comprising a touch panel display.

6. A communication apparatus, comprising:

a communication section that controls communication to a destination via a line;

a display section that displays hypertexts transmitted from the destination, the hypertexts having a plurality of input fields;

hardware keys selectively operable in a first mode to input a destination number to said communication section in order to communicate with the destination, and in a second mode to input data to the input fields of the hypertexts;

software keys operable to input data to the input fields of the hypertexts, said software keys being displayed on a screen of said display section;

a control device that controls an input position of data, in the display section, by said hardware keys and by said software keys;

a table in which a flag is set, the flag indicating that one of said hardware keys and said software keys are usable;

a control section that controls input of data by each of said hardware keys and said software keys and controls a status of the hardware keys in one of the first and second modes; and a detector that detects whether said communication section is in an off-hook condition;

wherein said control section, when the flag indicates said hardware keys and the control device controls the input position of data to be within the input fields of the hypertexts, enables input of data by said hardware keys to the input fields of the hypertexts, and when the flag indicates said software keys and the control device controls the input position of data to be within the input fields of the hypertexts, enables input of data by said software keys to the input fields of the hypertexts, and when said detector detects the off-hook condition, switches the hardware keys to the first mode to input a destination number.

7. The communication terminal apparatus according to claim 6, said control device comprising a plurality of cursor keys.

8. The communication terminal apparatus according to claim 6, said control section, upon occurrence of a predetermined condition after switching of said hardware keys to said first mode, switches said hard ware keys to said second mode.

9. The communication terminal apparatus according to claim 6, said display section comprising a touch panel display.

* * * * *

UNITED STATES PATENT AND TRADEMARK OFFICE
CERTIFICATE OF CORRECTION

PATENT NO.    : 6,459,423 B1
DATED         : October 1, 2002
INVENTOR(S)   : H. Shimoosawa et al.

It is certified that error appears in the above-identified patent and that said Letters Patent is hereby corrected as shown below:

<u>Column 12,</u>
Line 47, "hard ware" should be -- hardware --.

Signed and Sealed this

Fifteenth Day of April, 2003

JAMES E. ROGAN
*Director of the United States Patent and Trademark Office*